United States Patent
Dotzel et al.

(10) Patent No.: US 8,609,047 B2
(45) Date of Patent: Dec. 17, 2013

(54) EXTRUDED SCR FILTER

(75) Inventors: Ralf Dotzel, Nuremberg (DE); Rainer Leppelt, Lichtenfels (DE); Jörg Werner Münch, Lichtenfels (DE); Hubert Schedel, Küps (DE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/384,562

(22) PCT Filed: Feb. 1, 2011

(86) PCT No.: PCT/GB2011/050162
§ 371 (c)(1),
(2), (4) Date: Jan. 17, 2012

(87) PCT Pub. No.: WO2011/092521
PCT Pub. Date: Aug. 4, 2011

(65) Prior Publication Data
US 2012/0117952 A1 May 17, 2012

Related U.S. Application Data

(60) Provisional application No. 61/300,279, filed on Feb. 1, 2010.

(51) Int. Cl.
*B01D 35/00* (2006.01)
*B01D 46/00* (2006.01)
*B01D 53/56* (2006.01)
*B01D 53/94* (2006.01)
*B01J 23/10* (2006.01)
*B01J 29/06* (2006.01)
*F01N 3/10* (2006.01)
*F01N 3/28* (2006.01)

(52) U.S. Cl.
USPC ............ 423/213.2; 423/213.5; 423/213.7; 423/239.2; 60/299; 60/301; 60/311; 502/60; 502/64; 502/73; 502/84; 502/100; 502/304; 95/273; 95/285; 55/DIG. 30

(58) Field of Classification Search
USPC ........ 423/213.2, 213.5, 213.7, 239.2; 60/299, 60/301, 311; 502/60, 64, 73, 84, 100, 304; 95/273, 285; 55/DIG. 30
See application file for complete search history.

(56) References Cited

U.S. PATENT DOCUMENTS

| | | | |
|---|---|---|---|
| 3,181,231 A * | 5/1965 | Breck | 75/229 |
| 4,510,261 A | 4/1985 | Pereira et al. | |
| 5,244,852 A | 9/1993 | Lachman et al. | |
| 5,292,991 A | 3/1994 | Lachman et al. | |
| 5,447,694 A | 9/1995 | Swaroop et al. | |
| 5,552,128 A | 9/1996 | Chang et al. | |
| 5,589,147 A | 12/1996 | Farnos et al. | |
| 5,772,972 A | 6/1998 | Hepburn et al. | |
| 5,897,846 A * | 4/1999 | Kharas et al. | 423/213.2 |
| 6,110,862 A | 8/2000 | Chen et al. | |
| 6,248,684 B1 | 6/2001 | Yavuz et al. | |
| 6,432,859 B1 | 8/2002 | Iwakuni et al. | |
| 6,488,903 B2 | 12/2002 | Mathes et al. | |
| 6,555,081 B2 | 4/2003 | Hori et al. | |
| 6,667,018 B2 | 12/2003 | Noda et al. | |
| 6,780,805 B2 | 8/2004 | Faber et al. | |
| 7,507,684 B2 | 3/2009 | Hofmann et al. | |
| 7,883,678 B2 | 2/2011 | Li et al. | |
| 8,087,235 B2 | 1/2012 | Strehlau et al. | |
| 8,263,032 B2 | 9/2012 | Andersen et al. | |
| 2002/0051742 A1 | 5/2002 | Hotta et al. | |
| 2002/0077247 A1 | 6/2002 | Bender et al. | |
| 2002/0140138 A1 | 10/2002 | Wu et al. | |
| 2002/0183191 A1 | 12/2002 | Faber et al. | |
| 2003/0125194 A1 | 7/2003 | Abe et al. | |
| 2003/0224933 A1 | 12/2003 | Kondo et al. | |
| 2006/0179825 A1 | 8/2006 | Hu et al. | |
| 2007/0012028 A1 | 1/2007 | Weissman et al. | |

(Continued)

FOREIGN PATENT DOCUMENTS

| EP | 0 756 891 A1 | 2/1997 |
|---|---|---|
| EP | 0 801 972 A1 | 10/1997 |

(Continued)

OTHER PUBLICATIONS

Ido et al., "Fundamental Study and Possible Application of New Concept Honeycomb Substrate for Emission Control," *SAE Technical Paper Series*, Paper No. 2007-01-0658, Copyright © 2007 SAE International.
Howitt et al., "Cellular Ceramic Diesel Particulate Filter," *SAE Technical Paper Series*, Paper No. 810114, Copyright © 1981 Society of Automotive Engineers, Inc.
Heck et al., *Catalytic Air Pollution Control—Commercial Technology*, Second Edition, John Wiley & Sons, Inc., New York, 2002, Chapters 7 and 9, pp. 130-185 and 212-262.
International Search Report dated May 11, 2011, from PCT International Application No. PCT/GB2011/050162.
British Search Report dated Jun. 1, 2011, from British Patent App. No. 1101691.2.
U.S. Appl. No. 13/384,568, filed Jan. 17, 2012, Andersen et al.
U.S. Appl. No. 13/384,570, filed Jan. 17, 2012, Andersen et al.
U.S. Appl. No. 13/384,564, filed Jan. 17, 2012, Dotzel et al.
U.S. Appl. No. 13/384,572, filed Jan. 17, 2012, Collier et al.
Li et al., "Application of zeolites as hydrocarbon traps in automotive emission controls," *Studies in Surface Science and Catalysis*, 2005, vol. 158, pp. 1375-1382.

*Primary Examiner* — Timothy Vanoy
(74) *Attorney, Agent, or Firm* — RatnerPrestia

(57) ABSTRACT

A wall-flow filter comprises a catalyst for converting oxides of nitrogen in the presence of a reducing agent, which wall-flow filter comprising an extruded solid body comprising: 10-95% by weight of at least one binder/matrix component; 5-90% by weight of a zeolitic molecular sieve, a non-zeolitic molecular sieve or a mixture of any two or more thereof; and 0-80% by weight optionally stabilized ceria, which catalyst comprising at least one metal, wherein: the at least one metal is present throughout the extruded solid body alone or in combination with: is also present in a higher concentration at a surface of the extruded solid body; is also carried in one or more coating layer(s) on a surface of the extruded solid body; or both.

20 Claims, 2 Drawing Sheets

(56) References Cited

U.S. PATENT DOCUMENTS

| | | |
|---|---|---|
| 2007/0014710 A1 | 1/2007 | Gerlach et al. |
| 2007/0134145 A1 | 6/2007 | Strehlau et al. |
| 2007/0259770 A1 | 11/2007 | Hofmann et al. |
| 2008/0069743 A1 | 3/2008 | Castellano et al. |
| 2008/0182020 A1 | 7/2008 | Eberle et al. |
| 2009/0143221 A1 | 6/2009 | Ogunwumi et al. |
| 2009/0196813 A1 | 8/2009 | Sobolevskiy et al. |
| 2010/0034717 A1 | 2/2010 | Adelmann et al. |
| 2010/0050604 A1 | 3/2010 | Hoard et al. |
| 2010/0111789 A1 | 5/2010 | Fajardie et al. |
| 2010/0222205 A1 | 9/2010 | Ogunwumi et al. |
| 2010/0290963 A1 | 11/2010 | Andersen et al. |
| 2010/0295218 A1 | 11/2010 | Dotzel et al. |
| 2010/0296992 A1 | 11/2010 | Jiang et al. |
| 2011/0021856 A1 | 1/2011 | Lai et al. |
| 2011/0281720 A1 | 11/2011 | Andersen et al. |

FOREIGN PATENT DOCUMENTS

| | | |
|---|---|---|
| EP | 1 338 322 A1 | 8/2003 |
| EP | 1 493 484 A1 | 1/2005 |
| EP | 1 739 066 A1 | 1/2007 |
| EP | 1 837 063 A1 | 9/2007 |
| EP | 2 105 589 A1 | 9/2009 |
| EP | 2 123 354 A1 | 11/2009 |
| EP | 2 130 589 A2 | 12/2009 |
| EP | 2 130 603 A2 | 12/2009 |
| EP | 2 130 605 A2 | 12/2009 |
| GB | 2 450 484 A | 12/2008 |
| JP | 2010-497 A | 1/2010 |
| JP | 2010-499 A | 1/2010 |
| WO | WO-99/47260 A1 | 9/1999 |
| WO | WO-2006/093802 A2 | 9/2006 |
| WO | WO-2008/049491 A1 | 3/2008 |
| WO | WO-2008/132452 A2 | 11/2008 |
| WO | WO-2008/154739 A1 | 12/2008 |
| WO | WO-2009/001131 A1 | 12/2008 |
| WO | WO-2009/080155 A1 | 7/2009 |
| WO | WO-2009/093071 A1 | 7/2009 |
| WO | WO-2010/099288 A2 | 9/2010 |
| WO | WO-2010/099395 A1 | 9/2010 |
| WO | WO-2011/026573 A1 | 3/2011 |
| WO | WO-2011/080525 A1 | 7/2011 |

* cited by examiner

US 8,609,047 B2

EXTRUDED SCR FILTER

CROSS-REFERENCE TO RELATED APPLICATIONS

This application is the U.S. National Phase application of PCT International Application No. PCT/GB2011/050162, filed Feb. 1, 2011, and claims priority of U.S. Provisional Patent Application No. 61/300,279, filed Feb. 1, 2010, the disclosures of both of which are incorporated herein by reference in their entireties for all purposes.

FIELD OF THE INVENTION

The present invention relates to a wall-flow filter comprising an extruded solid body for use in treating oxides of nitrogen in exhaust gas emissions from internal combustion engines from stationary source and mobile applications.

BACKGROUND OF THE INVENTION

EP 1739066 discloses a honeycomb structure comprising multiple honeycomb units having multiple through holes; and a seal layer that joins honeycomb units with each other via respective closed outer faces of the honeycomb units where the through holes are not open. The honeycomb unit includes at least inorganic particles, inorganic fibers and/or whiskers. The inorganic particles exemplified are alumina, titania, silica and zirconia; the inorganic fibres exemplified are silica alumina fibres; and the inorganic binders exemplified are silica sol, alumina sol, sepiolite and attapulgite. A catalyst component can be carried on the honeycomb structure. The catalyst component may include at least one type selected among noble metals including platinum, palladium and rhodium, alkali metals such as potassium and sodium, alkaline earth metal e.g. barium and oxides. The honeycomb structure can be used as a catalytic converter e.g. a three-way catalyst or a $NO_x$ storage catalyst for conversion of the exhaust gas of vehicles.

WO 2009/093071 discloses a wall-flow filter monolith substrate having a porosity of at least 40% formed from a selective catalytic reduction catalyst of extruded type.

U.S. Pat. No. 7,507,684 discloses an extruded monolithic catalytic converter for converting oxides of nitrogen in the presence of a reducing agent and a method of manufacturing such an extruded monolithic catalytic converter.

WO 2009/001131 discloses a method of converting nitrogen oxides in a gas stream to nitrogen comprising contacting the nitrogen oxides with a nitrogenous reducing agent in the presence of a non-zeolite base metal catalyst consisting of: (a) at least one transition metal dispersed on a mixed oxide or composite oxide or a mixture thereof as support material consisting of cerium and zirconium; or (b) cerium oxide and zirconium oxide as single oxides or a composite oxide thereof or a mixture of the single oxides and the composite oxide dispersed on an inert oxide support material, on which inert support material is also dispersed at least one transition metal.

SUMMARY OF THE INVENTION

We have now developed a family of catalysts comprising an extruded solid body and at least one metal with particular application in the field of exhaust gas aftertreatment of internal combustion engine exhaust gas. Such exhaust gases may result from stationary source emissions, but they have been developed for use in particular for treating mobile sources of emissions, such as passenger cars, trucks and buses.

According to one aspect, the invention provides a wall-flow filter comprising a catalyst for converting oxides of nitrogen in the presence of a reducing agent, which wall-flow filter comprising an extruded solid body comprising: 10-95% by weight of at least one binder/matrix component; 5-90% by weight of a zeolitic molecular sieve, a non-zeolitic molecular sieve or a mixture of any two or more thereof; and 0-80% by weight optionally stabilised ceria, which catalyst comprising at least one metal, wherein: (i) the at least one metal is present throughout the extruded solid body; (ii) the at least one metal is present throughout the extruded solid body and is also present in a higher concentration at a surface of the extruded solid body; (iii) the at least one metal is present throughout the extruded solid body and is also carried in one or more coating layer(s) on a surface of the extruded solid body; or (iv) the at least one metal is present throughout the extruded solid body, is present in a higher concentration at a surface of the extruded solid body and is also carried in one or more coating layer(s) on the surface of the extruded solid body.

BRIEF DESCRIPTION OF THE DRAWINGS

In order that the invention may be more fully understood, the following Examples are provided by way of illustration only and with reference to the accompanying drawings in which.

DETAILED DESCRIPTION OF THE INVENTION

Figure 1:
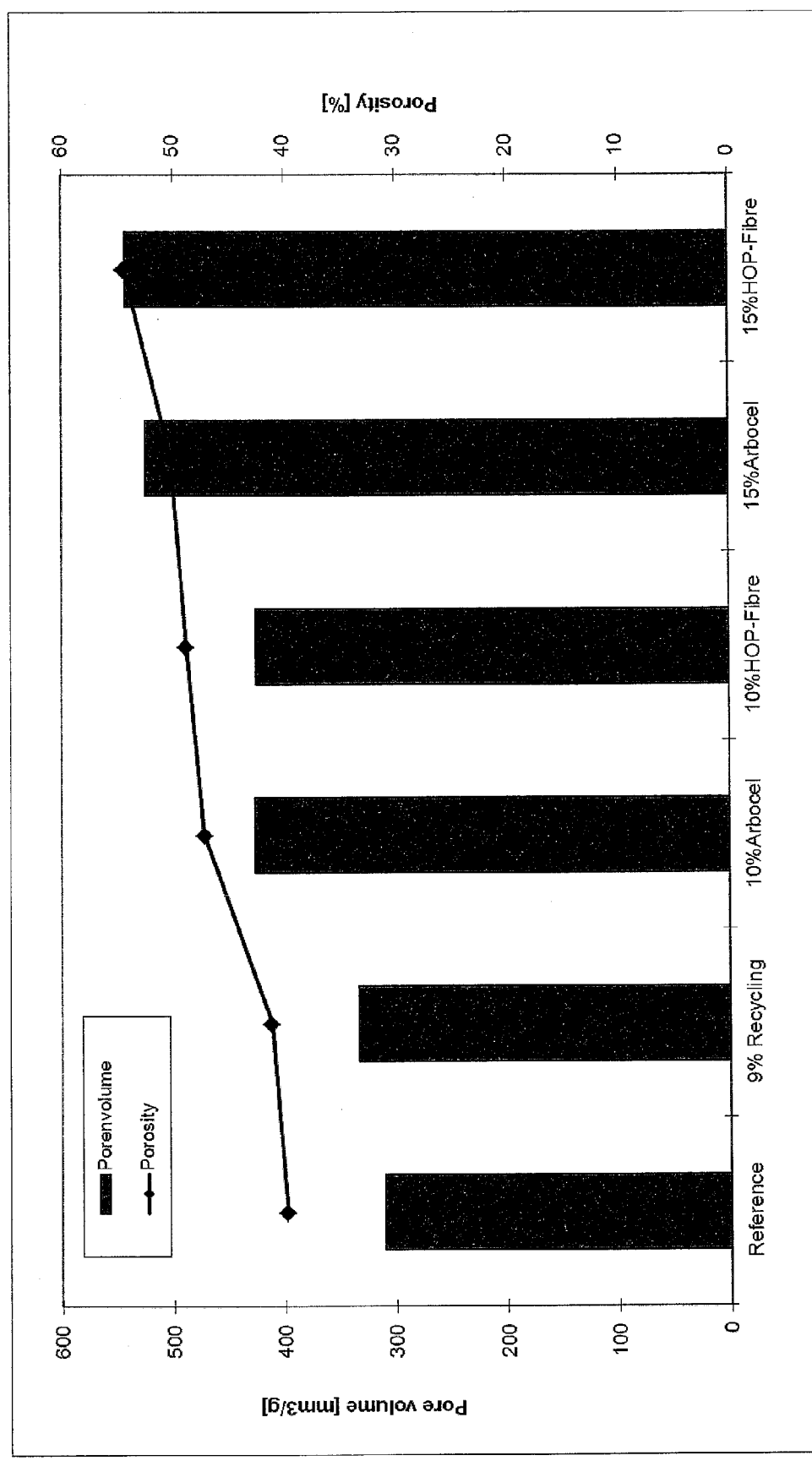
FIG. 1 is a graph comparing the pore volume and porosity of various $V_2O_5/WO_x$—$TiO_2$ filter materials prepared using various pore modifiers relative to a Reference product used in a flow-through configuration.

In advantage of the present invention is that by removing catalytic components that are often used in catalytic coatings, the number of coatings can be reduced, e.g. from two layers to one layer; or a single layer can be removed altogether and catalytic metal can be supported on a surface of the extruded solid body as such. This has benefits in reducing backpressure in an exhaust system, increasing the efficiency of the engine.

Furthermore, by providing the possibility of uncoated catalysts, the extruded solid body can be manufactured at higher cell density, increasing strength and decreasing the thickness of cell walls which can improved light off performance and increasing activity through mass transfer.

Also it is possible to increase the volume of active components in an extruded solid body relative to a coating on an inert substrate monolith. For example, a typical catalytic coating of a non-zeolitic molecular sieve-based catalyst for reducing oxides of nitrogen using a nitrogenous reductant on an inert substrate monolith is about 2.2 g in$^{-3}$, whereas the same catalyst can be extruded at 7.5 g in$^{-3}$. We have also found that catalysts disclosed in our WO 2009/001131 disclosed above can be coated at about 2.7 g in$^{-3}$, whereas the equivalent material can be extruded as a solid body at 12 g in$^{-3}$. This increased catalyst density has advantages for long term durability and catalyst performance, which is important for on-board diagnostics.

"On board diagnostics" (OBD) in the context of a motor vehicle is a generic term to describe the self diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardised digital connection port and are capable of providing information on standardised diagnostic trouble codes and a selection of real-time data, which enable rapid problem identification and resolution of a vehicle's systems.

Current OBD requirements require that a driver must be notified in case of a malfunction or deterioration of the emission system that would cause emissions to exceed mandatory thresholds. So, for example, the OBD limits for Euro 4: 98/69/EC for passenger diesel vehicles (category M vehicles as defined by 70/156/EEC) are: carbon monoxide (CO)—3.2 g/km; hydrocarbons (HC)—0.4 g/km; nitrogen oxides ($NO_x$)—1.2 g/km; and particulate matter (PM) 0.18 g/km. For passenger petrol (gasoline) vehicles, the Euro 4 limits are: CO—3.2 g/km; HC—0.4 g/km; $NO_x$—0.6 g/km; and PM—no limit.

Future vehicular emissions legislation, especially in US and Europe, requires higher sensitivity in diagnostic function so as continuously to monitor the ability of an exhaust system aftertreatment catalyst to meet the emission legislation. For example, the current draft OBD limits for Euro 5: 715/2007/EC for compression ignition (diesel) passenger vehicles are: CO—1.9 g/km; non-methane hydrocarbons (NMHC)—0.25 g/km; $NO_x$—0.54 g/km; PM—0.05 g/km; and for positive ignition (gasoline) passenger vehicles: CO—1.9 g/km; NMHC—0.25 g/km; $NO_x$—0.54 g/km; and PM—no limit.

In US it is understood that the OBD II legislation (Title 13, California Code Regulations, Section 1968.2, Malfunction and Diagnostic System Requirements for 2004 and Subsequent Model-Year Passenger Cars, Light-Duty Trucks and Medium-Duty Vehicles and Engines) for catalyst monitoring of gasoline/spark ignited engines requires a malfunction signal where the average Federal Test Procedure (FTP) test for NMHC conversion efficiency of a monitored portion of a catalyst system falls below 50%.

Extruded solid bodies according to the present invention generally comprise a unitary structure in the form of a honeycomb having uniform-sized and parallel channels extending from a first end to a second end thereof. Generally, the channels are open at both the first and second ends—a so-called "flow through" configuration. Channel walls defining the channels are porous. Typically an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked e.g. with a suitable ceramic cement, and channels not blocked at the first, upstream end can also be blocked at a second, downstream end to form a so-called wall-flow filter. Typically, the arrangement of the blocked channels at the first, upstream end resembles a chequer board with a similar arrangement of blocked and open downstream channel ends.

It is clear that the honeycomb structure disclosed in EP 1739066 has a Thermal Shock Parameter (TSP) too low to be used in a single unitary extrudate, because the honeycomb structure comprises an assembly of individual honeycomb units cemented together. This, arrangement, also seen in commercially available silicon carbide honeycombs, is designed to avoid catastrophic catalyst substrate failure due to inter alia thermal shock as a result of a relatively high Coefficient of Thermal Expansion (CTE) of the extruded material. However, the manufacture of a honeycomb structure from individual honeycomb units is complicated, laborious, time consuming and expensive and increases the number of possible physical failure modes, e.g. at the cement bonds, compared with a single piece extrusion. A more complete explanation of TSP and CTE can be found in "Catalytic Air Pollution Control—Commercial Technology", Second Edition, R. M. Heck et al., John Wiley & Sons, Inc., New York, 2002 Chapters 7 (in relation to flowthrough monoliths) and 9 (for wall-flow filters).

Accordingly, we prefer that the extruded solid body of the catalyst according to the invention has an axial Thermal Shock Parameter (TSP) and a radial TSP sufficient to avoid radial cracks and ring cracks in the extruded solid body when used for treating exhaust gases from a stationary or mobile source of emissions. In this way the extruded solid body can be formed from a single unitary extrudate. For extruded solid bodies having a particularly large cross-section, it may still be necessary to extrude segments of the extruded solid body for cementing together. However, this is because of difficulties in processing extrudates of such a large cross section, or because of limitations in the size of the extrudate die tooling. Taken individually, however, each segment of the whole catalyst would meet the functional limitation that the axial TSP and the radial TSP are sufficient to avoid radial cracks and ring cracks in the individual extruded solid body segments when used for treating exhaust gases from a stationary or mobile source of emissions. In one embodiment the radial TSP is >0.4 at 750° C., such as >0.5, >0.6, >0.7, >0.8>0.9 or >1.0. At 800° C., the radial TSP is desirably also >0.4 and at 1000° C. is preferably >0.8.

The CTE of wall-flow filters is preferably $20 \times 10^{-7}$/° C. in order to be formed from a one-piece extrudate.

In embodiments, the at least one binder/matrix component can be selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof.

Spinels can be $MgAl_2O_4$ or the Mg can be partially replaced by a metal from the group consisting of Co, Zr, Zn or Mn. In embodiments the content of MgO in the $MgAl_2O_4$ relative to $Al_2O_3$ can be from 0.8 to 2.5, with values of <1.0 preferred.

The alumina binder/matrix component is preferably gamma alumina, but can be any other transition alumina, i.e. alpha alumina, beta alumina, chi alumina, eta alumina, rho alumina, kappa alumina, theta alumina, delta alumina, lanthanum beta alumina and mixtures of any two or more such transition aluminas.

It is preferred that the alumina is doped with at least one non-aluminium element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica, a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof.

Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof. Alternatively, the silica can be derived from calcining tetramethyl ortho silicate (TMOS) added to the extrusion composition.

Suitable clays include fullers earth, sepiolite, hectorite, a smectite, a kaolin and mixtures of any two or more thereof, wherein the kaolin can be chosen from subbentonite, anauxite, halloysite, kaolinite, dickite, nacrite and mixtures of any two of more thereof; the smectite can be selected from the group consisting of montmorillonite, nontronite, vermiculite, saponite and mixtures of any two or more thereof; and the fullers earth can be montmorillonite or palygorskite (attapulgite).

Inorganic fibres are selected from the group consisting of carbon fibres, glass fibres, metal fibres, boron fibres, alumina fibres, silica fibres, silica-alumina fibres, silicon carbide fibres, potassium titanate fibres, aluminum borate fibres and ceramic fibres.

The or each zeolitic molecular sieve or the or each non-zeolitic molecular sieve can be selected from the framework type code ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOF, BOG, BPH, BRE, BSV, CAN, CAS, CDO, CFI, CGF, CGS, CHA, -CHI, -CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITR, ITW, IWR, IWS, IWV, IWW, JBW, JRY, KFI, LAU, LEV, LIO, -LIT, LOS, LOV, LTA, LTF, LTL, LTN, MAR, MAZ, MEI, MEL, MEP, MER, MFI, MFS, MON, MOR, MOZ, MRE, MSE, MSO, MTF, MTN, MTT, MTW, MWW, NAB, NAT, NES, NON, NPO, NSI, OBW, OFF, OSI, OSO, OWE, -PAR, PAU, PHI, PON, RHO, -RON, RRO, RSN, RTE, RTH, RUT, RWR, RWY, SAO, SAS, SAT, SAY, SBE, SBN, SBS, SBT, SFE, SFF, SFG, SFH, SFN, SFO, SFS, SGT, SIV, SOD, SOF, SOS, SSF, SSY, STF, STI, STO, STT, STW, -SVR, SZR, TER, THO, TOL, TON, TSC, TUN, UEI, UFI, UOS, UOZ, USI, UTL, VET, VFI, VNI, VSV, WEI, -WEN, YUG, ZON as defined by the Structure Commission of the International Zeolite Association and mixtures of any two or more thereof.

In preferred embodiments, the zeolitic molecular sieve or the non-zeolitic molecular sieve has a maximum 8-ring pore opening structure as defined by the Structure Commission of the International Zeolite Association.

In one embodiment, zeolites for use in the present are not A-, X- or Y-zeolites, mordenite, beta, ZSM-5 or USY. That is, these zeolites may be excluded from the scope of the claims.

Preferred zeolitic and non-zeolitic molecular sieves are selected from the group consisting of AEI, AFT, AFX, BEA, CHA, DDR, ERI, FAU, FER, ITE, ITW, KFI, LEV, LTA, MER, MFI, MOR, MTS, NSI, PAU, PHI, RHO, RTH, STI, SZR, UFI and mixtures of any two or more thereof.

Particularly preferred zeolitic or non-zeolitic molecular sieves are selected from the group consisting of AEI, BEA, CHA, ERI, FER, MFI, NSI, STI and mixtures of any two or more thereof. Particularly preferred zeolitic molecular sieves are ZSM-5, beta, ferrierite, SSZ-13 and mixtures of any two or more thereof.

Although natural zeolitic molecular sieves can be used in the present invention, we prefer synthetic aluminosilicate zeolitic molecular sieve having a silica-to-alumina ratio of 10 or greater, for example 15 to 150, 20 to 60 or 25 to 40 for improved thermal stability.

In an alternative embodiment, the zeolitic molecular sieve or the non-zeolitic molecular sieve is an isomorph containing one or more substituent framework metal. In this embodiment, the or each substituent framework metal can be selected from the group consisting of As, B, Be, Ce, Co, Cu, Fe, Ga, Ge, Li, Mg, Mn, Zn and Zr, with Ce, Cu and Fe. Again, preferred isomorphic zeolitic or non-zeolitic molecular sieves can be selected from the group consisting of AEI, BEA, CHA, ERI, FER, MFI, NSI, STI and mixtures of any two or more thereof, with BEA including Fe in its framework particularly preferred. It will be understood that the process of manufacturing such isomorphs containing one or more substituent framework metal, the or each metal may be present in the final product either solely in the framework or in the framework and ion-exchanged.

Silica-to-alumina ratios in isomorphs containing one or more substituent framework metal can be >25, such as 30 to 100 or 40 to 70. By contrast, the isomorph can have a silica-to-framework metal ratio of >20, such as from 30 to 200 or 50 to 100.

In a preferred embodiment, the non-zeolitic molecular sieve is an aluminophosphate, including AlPOs, metal substituted AlPOs (MeAlPOs), silicoaluminophosphates (SAPOs) or a metal substituted silicoaluminophosphates (MeAPSOs). Preferred non-zeolitic molecular sieves include SAPO-18, SAPO-34, SAPO-44 and SAPO-47.

Silica-to-alumina ratios of the aluminophophates are generally much lower than aluminosilicate zeolites sharing the same framework type code. Typically, the silica-to-alumina ratio of aluminophosphates is <1.0, but can be <0.5 or even <0.3.

The ceria component can be optionally stabilised with at least one non-cerium element to increase the thermal stability of the ceria. Suitable ceria stabilisers include zirconium, lanthanides and mixtures of any two or more thereof. Lanthanide stabilisers include La, Nd, Pr, Gd and mixtures of any two or more thereof. The $CeO_2$:$ZrO_2$ ratio by weight can be e.g. between 80:20 or 20:80. Commercially available materials include 30% by weight $CeO_2$, 63% $ZrO_2$, 5% $Nd_2O_3$, 2% $La_2O_3$; and 40% $CeO_2$, 50% $ZrO_2$, 4% $La_2O_3$, 4% $Nd_2O_3$ and 2% $Y_2O_3$.

Broadly, the at least one metal can be present: (a) throughout the extruded solid body, i.e. the at least one metal is present in the extrudate composition; (b) present in a higher concentration at a surface of the extruded solid body; and/or (c) carried in one or more coating layer(s) on a surface of the extruded solid body in features (ii), (iii) and (iv) is different from the at least one metal present in each of the other location(s) at (a), (b) and (c). So the at least one metal can be present at location (a), (a) plus (b), (a) plus (c) or (a) plus (b) plus (c). Where the at least one metal is present in (a) and (b), (a) and (c) or (a), (b) and (c), the at least one metal in each location can be the same or different.

Where the at least one metal is present in location (a), i.e. throughout the extruded solid body, the at least one metal can be associated, where present, with a zeolitic molecular sieve, a non-zeolitic molecular sieve or a mixture of any two or more thereof. An example of "associated with" includes being ion exchanged with the zeolitic molecular sieve component, the non-zeolitic molecular sieve component or either or both of the zeolitic molecular sieve component and the non-zeolitic molecular sieve components in the mixture. It is also possible in mixtures of two or more molecular sieves to have the at least one metal associated with one molecular sieve and not the other. For example, a first molecular sieve can be ion-exchanged with copper, dried and calcined and then mixed with a different molecular sieve with no associated additional metal.

Alternatively, one of two molecular sieves in a mixture can be associated, e.g. ion exchanged, with a first at least one metal and then a second at least one metal can be added to the extrudate composition, i.e. the second at least one metal is not specifically associated with the second molecular sieve.

Suitable at least one metal(s) to associate with the or each molecular sieve component can be selected individually from the group consisting of a transition metal, a lanthanide or a mixture of any two or more thereof. Suitable transition metals include Group IB metals, Group IVB metals, Group VB metals, Group VIIB metals and Group VIII metals. Preferably the at least one transition metal is selected from the group consisting of Fe, Cu, Ce, Hf, La, Mn, Pt, Au, Ag, In, Rh, V, Ir, Ru, and Os and mixtures of any two or more thereof. The lanthanide metal can be La, Pr, Ce and mixtures of two or more thereof.

The total metal content in the at least one metal associated with the or each molecular sieve component is from 0.1 to 20% by weight, such as from 1 to 9% by weight.

The at least one metal present: throughout the extruded solid body but not associated with the or each molecular sieve; in the majority of the at least one metal located at the surface of the extruded solid body; in one or more coating layer(s) on the surface of the extruded solid body; or in the higher concentration at the surface of the extruded solid body can be selected from the group consisting of an alkali metal, an alkaline earth metal, a transition metal, a lanthanide or a mixture of any two or more thereof.

Suitable coatings for supporting catalytic metals for use in the present invention include one or more of alumina ($Al_2O_3$), particularly γ-alumina, silica ($SiO_2$), titania ($TiO_2$), ceria ($CeO_2$), zirconia ($ZrO_2$), vanadia ($V_2O_5$), lanthana ($La_2O_3$) and zeolites. The ceria and alumina can be optionally stabilised using the same stabilisers as used for the extruded solid body. Suitable catalytic metals include one or more of the precious metals (Au, Ag and the platinum group metals, including Pt, Pd and Rh)).

Techniques for locating at least one metal in higher concentration at the surface of the extruded solid body include impregnation, preferably thickened impregnation, i.e. an impregnation medium thickened with a rheology modifier. Drying methods can also be used to concentrate metals at a surface of the extruded solid body. For example, a so-called "egg shell" technique, where metals are concentrated at the surface can be obtained by drying the impregnated extruded solid body relatively slowly so that the metals are deposited at the surface by wicking. Particular choices of salts and pH conditions can also be used to direct metal deposition, e.g. by determining the isoelectric point of the extruded solid body and then using the correct combination of pH and metal salts to benefit from an electrostatic attraction between cations or anions in the metal salts and the extruded solid body.

Suitable transition metals include a Group IB metal, a Group IVB metal, a Group VB metal, a Group VIB metal, a Group VIIB metal and a Group VIII metal. Preferably, the or each transition metal is selected from the group consisting of Fe, Ni, W, Cu, Ce, Hf, La, Mn, Pt, Au, Ag, In, V, Ir, Ru, Rh, Os and mixtures of any two or more thereof; lanthanide metals can be La, Pr or Ce or mixtures of any two or more thereof; alkali metals include K and Cs; and alkaline earth metals can be selected from Ba and Sr.

The total metal content throughout the extruded solid body but not associated with the or each molecular sieve component; located at the surface of the extruded solid body; and/or in the higher concentration at the surface of the extruded solid body can be from 0.1 to 20% by weight, such as from 1 to 9% by weight.

The total metal content of the extruded solid body, i.e. including any metal associated with the or each molecular sieve, can be from 0.1 to 25% by weight, such as from 1 to 15% by weight.

The total metal content of the catalyst as a whole, including one or more coating layer(s) on a surface of the extruded solid body comprises at least one metal, can be from 0.1 to 30% by weight, such as from 1 to 25% by weight.

In specific examples, the catalyst according to the invention comprises an extruded solid body comprising:
10-95% by weight of a cordierite, nitrides, carbides, borides, intermetallics, lithium aluminosilicate, an optionally doped alumina, a silica source, titania, zirconia, titania-zirconia, zircon and mixtures of any two or more thereof;
0-80% by weight of spinel;
5-90% by weight of a zeolitic molecular sieve, a non-zeolitic molecular sieve or a mixture of any two or more thereof, each optionally containing one or more metal;
0-80% by weight optionally stabilised ceria; and
0-25% by weight inorganic fibres.

The content of the at least one binder/matrix component can be >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the spinel can be >10% by weight, >15% by weight, >20% by weight, >30% by weight, >35% by weight, >40% by weight, >45% by weight, >50% by weight, >55% by weight, >60% by weight, >65% by weight or >70% by weight.

The content of the total content of the molecular sieve(s) can be >5% by weight, >10% by weight, >15% by weight, >20% by weight, >30% by weight, >35% by weight, >40% by weight, >45% by weight, >50% by weight, >55% by weight, >60% by weight, >65% by weight or >70% by weight, >75% by weight, >80% by weight, >85% by weight or >90% by weight.

The content of the optionally stabilised ceria can be >5% by weight, >10% by weight, >15% by weight, >20% by weight, >30% by weight, >35% by weight, >40% by weight, >45% by weight, >50% by weight, >55% by weight, >60% by weight, >65% by weight or >70% by weight.

The content of the inorganic fibres can be >5% by weight, >10% by weight, >15% by weight or >20% by weight.

In an embodiment particularly suited for a catalyst for reducing oxides of nitrogen using a nitrogenous reductant the extruded solid body consists essentially of: 10-50% by weight of cordierite, nitrides, carbides, borides, intermetallics, lithium aluminosilicate, a spinel, an optionally doped alumina, a source of silica, titania, zirconia, titania-zirconia, zircon and mixtures of any two or more thereof; 50-90% by weight of a zeolitic molecular sieve, a non-zeolitic molecular sieve or a mixture of any two or more thereof, each optionally containing one or more metal; and 0-25% by weight of inorganic fibres. This extruded solid body can be arranged as a flow through substrate monolith or it can be used to make a wall-flow filter. Preferred embodiments contain inorganic fibres.

Further embodiments can use an extruded solid body consisting essentially of: 10-37% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 60-88% by weight of a zeolitic molecular sieve, a non-zeolitic molecular sieve or a mixture of any two or more thereof, each optionally containing one or more metal; and 0-20% by weight of inorganic fibers; or: 15-30% by weight of cordierite, nitrides, carbides, borides, intermetallics, lithium aluminosilicate, an optionally doped alumina, a spinel, titania, zirconia, titania-zirconia, zircon and mixtures of any two or more thereof; 2-20% by weight of a source of silica; 50-81% by weight of a zeolitic molecular sieve, a non-zeolitic molecular sieve or a mixture of any two or more thereof, each optionally containing one or more metal; and 2-10% by weight of inorganic fibres.

In another embodiment the extruded solid body can consist essentially of: 10-75% by weight of cordierite, nitrides, carbides, borides, intermetallics, lithium aluminosilicate, an optionally doped alumina, a spinel, a silica source, titania, zirconia, titania-zirconia, zircon and mixtures of any two or more thereof; 0-50% by weight of a zeolitic molecular sieve, a non-zeolitic molecular sieve or a mixture of any two or more thereof, each optionally containing one or more metal; 20-80% by weight optionally stabilised ceria; and 0-25% by weight of inorganic fibres. Preferred embodiments contain zeolites and inorganic fibres.

In a particular embodiment, the alkaline earth such as Ba and/or Sr and/or the alkali metal e.g. K and/or Cs can be spray dried on the optionally stabilised ceria and the resulting spray dried product used to form the extruded solid body.

In developing extruded solid bodies for use in $NO_x$ trap catalysts according to the present invention, we have encountered a lack of strength in the extruded solid body in the composition: 69% by weight of $CeO_2$, and 23% by weight of $\gamma$-$Al_2O_3$ and 8% by weight glass fibres. Current proposals for increasing strength include pre-calcining the $CeO_2$ material to reduce surface loss during calcinations of the "green" extruded solid body; increasing the alumina content to 50%+; changing the particle size of the alumina (e.g. from commercially available Pural™ to Disperal™) and/or the optionally stabilised ceria; adding an inert binder to increase mechanical stability e.g. a clay; use a different alumina e.g. an alumina sol; testing other binder systems e.g. $TiO_2$ sols, $CeO_2$ sols; cerium acetate; zirconium acetate; optimising the pH; and adding surface modifiers e.g. aluminium salts or other organic surfactants. In preliminary tests we have found that the presence of silica can affect $NO_x$ trap performance. However, research is continuing and this option will be further investigated. However, in one embodiment the content of a source of silica will be reduced or removed altogether.

Where any of the above extruded solid bodies are made into a wall-flow filter, the porosity of the wall-flow filter can be from 30-80%, such as from 40-70%. A desirable feature of the extruded solid bodies for use in the present invention is that they have good pore interconnectivity and as few closed or "dead end" pores as possible. Suitable mean pore diameters are from 8-25 µm, such as from 15-20 µm. The porosity values expressed herein can be measured by mercury porosimetry or electron microscopy.

In a more specific example according to the present invention a wall-flow filter for converting oxides of nitrogen in the presence of a reducing agent comprises an extruded solid body consisting essentially of: 10-50% by weight of cordierite, nitrides, carbides, borides, intermetallics, lithium aluminosilicate, a spinel, an optionally doped alumina, titania, zirconia, titania-zirconia, zircon and mixtures of any two or more thereof; 0-30% by weight of a source of silica; 50-90% by weight of a non-zeolitic molecular sieve containing 1-20% by weight of one or more metal selected from the group consisting of Cu, Fe and Ce; and 0-20% by weight of inorganic fibres;

According to a further aspect, the invention provides a process of manufacturing a wall-flow filter according to the invention comprising the steps of: forming a solid extruded body by mixing powdered starting materials of: at least one binder/matrix component or a precursor of one or more thereof; optional zeolitic molecular sieve, non zeolitic molecular sieve or a mixture of any two or more thereof which zeolitic molecular sieve, non-zeolitic molecular sieve or mixture of zeolitic and non-zeolitic molecular sieves being optionally associated with at least one metal; an optional optionally stabilised ceria with optional inorganic fibres; and at least one metal compound; optionally adding an organic auxiliary agent; processing by mixing and/or kneading in an acid or alkaline aqueous solution optionally containing a metal salt of at least one metal into a plastic compound to form a mixture; extruding the mixture into a catalyst body, drying the catalyst body and calcining to form a solid extruded body; selecting quantitative proportions of the starting materials such that the solid extruded body contains 10-100% by weight of at least one binder/matrix component; 5-90% by weight of a zeolitic molecular sieve, a non-zeolitic molecular sieve or a mixture of any two or more thereof; and 0-80% by weight optionally stabilised ceria, and at least one metal or metal compound and optionally impregnating a surface of the solid extruded body with at least one metal and/or optionally coating a surface of the solid extruded body with at least one coating layer(s) containing at least one metal.

Typically, a cement is used impermeably to plug ends of channels in an extruded substrate monolith to form the wall-flow filter, e.g. as is disclosed in EP 1837063.

Very generally, the production of an extruded solid body, a binder, an organic viscosity-enhancing compound and a liquid for converting the material by blending into an homogeneous paste are added to the binder/matrix component or a precursor thereof and optional molecular sieve, optional optionally stabilised ceria, optional inorganic fibres and optional at least one metal compound, and the mixture is compacted in a mixing or kneading apparatus or an extruder. The mixtures have organic additives such as binders, plasticizers, surfactants, lubricants, dispersants as processing aids to enhance wetting and therefore produce a uniform batch. The resulting plastic material is then moulded, in particular using an extrusion press or an extruder including an extrusion die, and the resulting mouldings are dried and calcined. The organic additives are "burnt out" during calcinations of the extruded solid body.

The at least one binder/matrix component is selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. An alumina precursor can be used which is aluminium hydroxide or boehmite. Where an aluminium oxide is used, to ensure the binding with the aluminium oxide, it is advantageous to add an aqueous solution of a water-soluble metal salt to the aluminium oxide or the precursor substance of the aluminium oxide before adding the other starting materials.

In embodiments, the silica source can be selected from the group consisting of a silica, a silica sol, quartz, fused or amorphous silica, sodium silicate, an amorphous aluminosilicate, an alkoxysilane, a silicone resin binder, a clay, talc or a mixture of any two or more thereof.

In a particular embodiment, the silica source is a silicone resin binder and a solvent for the silicone resin binder is isopropyl alcohol or a dibasic ester.

One embodiment of the process according to the present invention comprises the step of first admixing an optionally doped alumina or a precursor thereof with the solution and subsequently admixing the zeolitic molecular sieve, non zeolitic molecular sieve or a mixture of any two or more thereof and the inorganic fibres.

The organic auxiliary agent for use in the process according to the present invention can be one or more selected from the group consisting of a cellulose derivative, an organic plasticizer, a lubricant and a water-soluble resin. Examples of suitable cellulose derivatives include cellulose ethers selected from the group consisting of methylcellulose, ethylcellulose, carboxymethylcellulose, ethylhydroxyethylcellulose, hydroxyethylcellulose, hydroxypropylcellulose, methylhydroxyethylcellulose, methylhydroxypropylcellulose and combinations of any two or more thereof. Cellulose derivatives increase the porosity of the final product, which is advantageous for the catalytic activity of the solid catalyst body. Initially the cellulose swells in the aqueous suspension but is ultimately removed during the calcining process.

The organic plasticizer for use in the process of the present invention is selected from the group consisting of polyvinyl alcohol, polyvinyl butyral, an ionomer, acrylics, copyethylene/acrylic acid, polyurethane, a thermoplastic elastomers, a relatively low molecular weight polyester, linseed oil, a ricinoleate and combinations of any two or more thereof.

The water-soluble resin can be a polyacrylate.

The lubricant for use in the process according to the present invention is selected from at least one of the group consisting of ethylene glycol, stearic acid, sodium stearate, glycerine and glycols.

Depending on the composition of the extrudate composition, the pH can be acid or alkaline. Where the process uses an acidic aqueous solution, the pH-value of the solution can be between 3 and 4. Desirably, acetic acid is used to acidify the solution.

Where the process uses an alkaline aqueous solution, the pH-value of the solution can be between 8 and 9. Ammonia can be used to adjust the pH to the alkaline side.

According to a further aspect, the invention provides a method of treating exhaust gas emissions from internal combustion engines comprising particulate matter and oxides of nitrogen from a stationary source or a vehicle, which method comprising contacting the exhaust gas mixed with a nitrogenous reductant with a filtering surface of the wall-flow filter according to the invention. In one embodiment, nitric oxide in the oxides of nitrogen is oxidised to nitrogen dioxide upstream of the filtering surface of the wall-flow filter. A temperature at which the exhaust gas contacts the catalyst is preferably >100° C., such as >150° C., >175° C., >200° C., >225° C., >250° C., >275° C. or >300° C. Preferably, the temperature at which the exhaust gas contacts the catalyst is <600° C., such as <550° C., <525° C. or <500° C.

According to a further aspect, the invention provides an exhaust system for an internal combustion engine, which exhaust system comprising a wall-flow filter according to the invention, a source of nitrogenous reductant and means for injecting nitrogenous reductant into a flowing exhaust gas upstream of the wall-flow filter. In a preferred embodiment, an oxidation catalyst for oxidising nitrogen oxide to nitrogen dioxide is disposed in the exhaust system upstream of the means for injecting nitrogenous reductant into a flowing exhaust gas.

In another aspect according to the invention there is provided a vehicle, e.g. an automobile, comprising an internal combustion engine and an exhaust system according to the invention. The internal combustion engine can be a compression ignition engine or a positive ignition engine. A positive ignition engine is typically fuelled with gasoline fuel, but other fuels can be used including gasoline fuel blended with oxygenates including methanol and/or ethanol, liquid petroleum gas or compressed natural gas. Compression ignition engines can be fuelled by diesel fuel, blends of diesel fuel and biodiesel or Fischer-Tropsch derived fuels, biodiesel as such or natural gas as such. Modern compression ignition engines including those known as the Dilution Controlled Combustion System (DCCS), for example Toyota's Smoke-less Rich Combustion concept. Emissions from Homogeneous Charge Compression Ignition (HCCI) engines may also be treated. In particular, modern engines wherein substantially all fuel for combustion is injected into a combustion chamber prior to the start of combustion may be treated. In a preferred embodiment, the internal combustion engine is a compression ignition engine.

EXAMPLES

Example 1

Extruded $V_2O_5/WO_x$—$TiO_2$ Filter

A Reference extruded $V_2O_5/WO_x$—$TiO_2$ solid body was prepared similarly to Examples 1 and 5 by blending components A, B, F and S as set out in Table 1 with water to make a kneadable paste. Additives H (pore modifiers) were added and the material was kneaded for 10 mins to disperse the pore modifiers. The resulting composition was extruded, dried and calcined as described in Examples 1 and 5. It should be noted that the percentage quantities of inorganic solids present in the final calcined article is 100%. Quantities of additives (here H and S) that are removed by combustion during calcination are provided in wt % relative to the 100% inorganic solids content.

TABLE 1

| Active Components | | Binder | | | Stabilizer | Extrusion Additive | | | Additional Additives | | |
|---|---|---|---|---|---|---|---|---|---|---|---|
| A1 | A2 | B1 | B2 | B3 | F1 | H1 | H2 | H3 | S1 | S2 | S3 |
| 82.90 | 1.70 | 3.00 | 3.00 | 1.40 | 8.00 | 1.00 | 1.00 | 0.30 | 1.76 | 9.20 | 0.56 |

A1 = TiW (98.9%, MC 10/Cristal)
A2 = $V_2O_5$ from AMV (78% $V_2O_5$, GFE)
B1 = Bentonite (90%, ACE/Mizuka)
B2 = Kaolin (97.9% TK0177/Thiele)
B3 = $SiO_2$ (100%, Tixosil/Novus)
F1 = Glass fibers (Vetrotex 4.5 mm/Saint Gobain)
H1 = Cellulose (QP10000H/Nordmann)
H2 = PEO (Alkox/Alroko)
H3 = Zusoplast (Zschimmer&Schwarz)
S1 = MEA (Imhoff & Stahl)
S2 = $NH_3$
S3 = $C_3H_6O_3$ (Fauth)

The following pore modifiers were used instead of the Extrusion Additives H1, H2 and H3 in Table 1, with amounts shown being relative to the total weight of inorganic solid in the recipe of Table 1.

TABLE 2

| Pore Modifier | Wt % Used in Table 1 Recipe | Pore Volume (mm³/g) | Pore Radius (Å) | Porosity (%) |
|---|---|---|---|---|
| Reference | See Table 1 | 310.1 | 1783.6 | 39.8 |
| Cellulose CMC-QP10000H (Nordmann) | 20 | | | |
| BC200 (Kremer Pigmente GmbH & Co. KG) | 13 | | | |
| PAN Fibres Recycling | 13 | | | |
| | 9 | 333.6 | 1930.9 | 41.2 |
| Arbocel (Schwarzwälder Textil-Werke) | 10 | 427 | 2950 | 47.2 |
| HOP Fibre (Osthoff-Petrasch GmbH) | 10 | 426 | 2629 | 48.8 |
| Arbocel (Schwarzwälder Textil-Werke) | 15 | 524 | 5281 | 50.2 |
| HOP Fibre (Osthoff-Petrasch GmbH) | 15 | 543 | 3085 | 54.4 |

Porosity and pore volume and pore radius can be measured e.g. using mercury intrusion porosimetry.

The results of Table 2 entries including pore volume and porosity are also represented in FIG. 1. It can be seen from these results that the porosity and pore volume of the Reference can be increased by appropriate selection of pore modifiers so that an extruded solid body made using such pore modifiers may be used in the manufacture of wall-flow filters.

These results are generic for increasing the porosity, pore volume etc. properties independent of the active components of the solid extruded body. That is, although increasing porosity and pore volume etc. of this Example 6 are illustrated using $V_2O_5/WO_x$—$TiO_2$ active materials, the principles of increasing porosity and pore volume etc. disclosed in this Example 6 are applicable to the extrusion of any active material, e.g. an extruded solid body for use in a gasoline soot filter comprising a three-way catalyst, because the pore modifiers are burnt out in the calcination process leaving the active materials and fillers etc. behind as inorganic solids.

Figure 2:
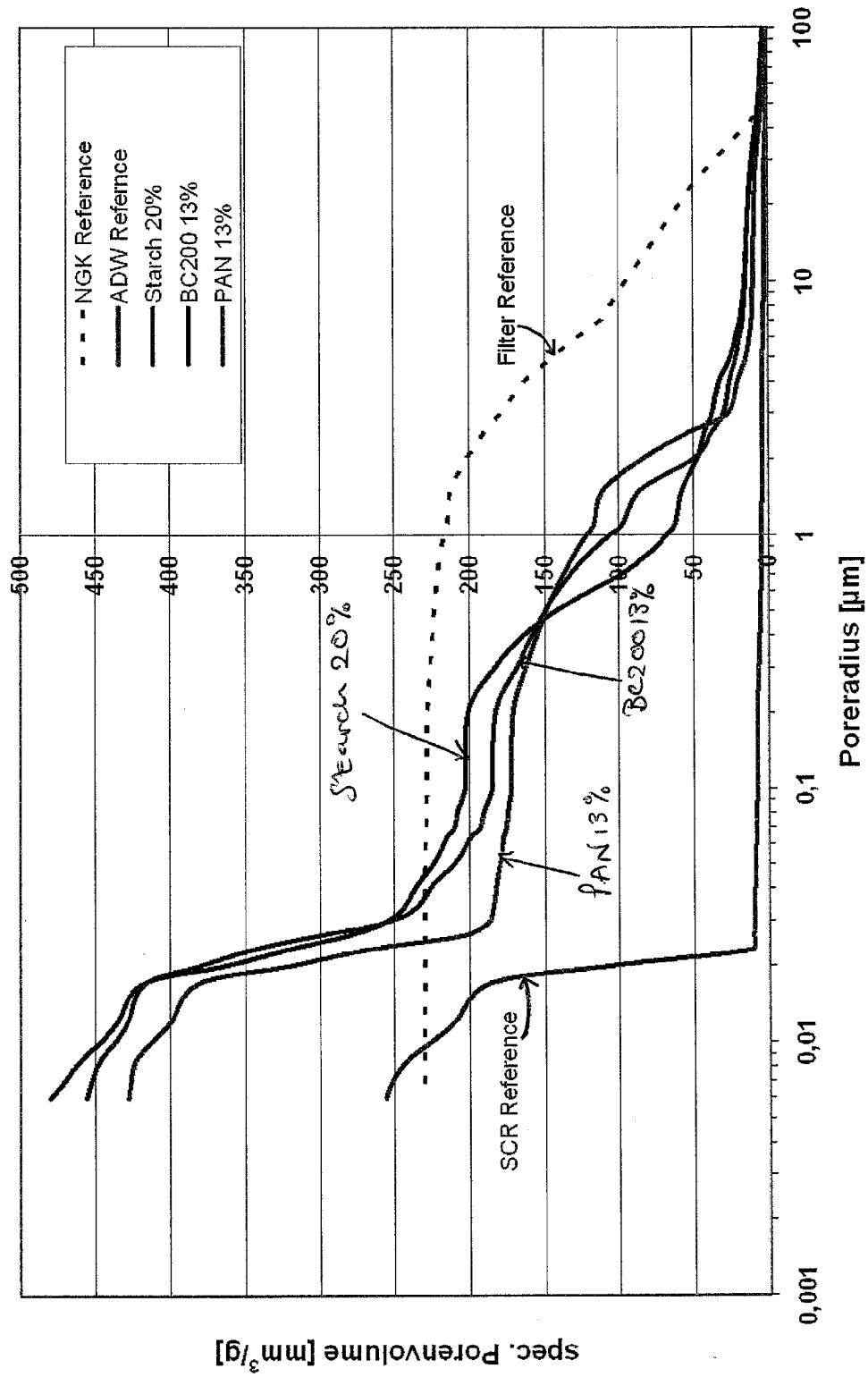
FIG. 2 is a graph plotting the pore volume against pore radius for a number of pore modifiers relative to the $V_2O_5/WO_x$—$TiO_2$ Reference and a commercially available wall-flow filter substrate.

FIG. 2 compares the pore volume of a different Reference with solid extruded $V_2O_5/WO_x$—$TiO_2$ materials prepared using other pore modifiers set out in Table 2 compared also with a commercially available wallflow filter (NGK). It can be seen from the graph that the inclusion of pore modifiers has improved the porosity and pore volume of the Reference extruded solid body so that the materials have properties approaching those of commercially available wall-flow filters.

Example 2

Extruded Zeolite Monolith Substrate

An extruded zeolite monolith substrate was made according to methods similar to those disclosed in U.S. Pat. No. 7,507,684. Powdered commercially available beta zeolite in hydrogen form is mixed with glass fibres, Kaolin filler and powdered synthetic boehmite (Pural SB) and is processed in an aqueous solution with a pH-value of 5-6 into a shapeable and flowable slip by admixture with cellulose (CMC-QP 10000H), the plasticizer Zusoplast (a brand name of Zschimmer & Schwarz GmbH & Co KG) and the organic auxiliary agent PEO Alkox (a polyethylene oxide) in quantities selected using Example 1 as a guide to provide a desired level of porosity. The quantitative proportions of the starting materials are selected in such a way that the active material of the finished solid catalyst body contains 69% by weight of zeolite, 23% by weight of $\gamma$-$Al_2O_3$, 5% by weight of glass fibers and 3% by weight of Kaolin. The shapeable mixture is extruded into a flowthrough honeycomb catalyst body, i.e. with continuous channels and with a circular cross-section exhibiting a cell density of 300 cpsi or 400 cpsi (cells per square inch). Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body.

Example 3

Extruded Zeolite Monolith Substrate Containing Fe-Beta Zeolite

Powdered commercially available beta zeolite in hydrogen form is mixed with iron hydroxide, glass fibres, a low alkaline clay filler and powdered synthetic boehmite (Pural SB) and is processed in an aqueous solution with a pH-value of 5-6 into a shapeable and flowable slip. When the mixture is well plasticised, cellulose is added at 8 wt % based on 100% of the total inorganic solids content. The quantitative proportions of the starting materials are selected in such a way that the active material of the finished solid catalyst body contains 55% by weight of zeolite, 25% by weight of the clay, 7% by weight of $\gamma$-$Al_2O_3$, 8% by weight of glass fibers and 5% by weight of iron and iron compounds in quantities selected using Example 1 as a guide to provide a desired level of porosity. The shapeable mixture is extruded into a flow-through honeycomb catalyst body, i.e. with continuous channels and with a circular exhibiting a cell density of 400 cpsi (cells per square inch). Subsequently, the catalyst body is freeze dried for 1 hour at 2 mbar according to the method described in WO 2009/080155 (the entire contents of which is incorporated herein by reference) and reductively calcined according to the method described in PCT patent application no. PCT/EP2010/005140 filed on 21 Aug. 2010 (the entire contents of which is incorporated herein by reference) at a temperature of 580° C. to form a solid catalyst body. It is found that by using the method described that at least some of the iron introduced into the mixture becomes ion-exchanged with the zeolite.

Example 4

Extruded Wall-Flow SCR Filter

This is a prophetic example. A wall-flow filter monolith substrate similar to WO 2009/093071 can be prepared as follows. An extruded monolith substrate comprising a non-zeolitic molecular sieve may be made according to methods similar to those disclosed in U.S. Pat. No. 7,507,684 and Example 1. An ion-exchanged SAPO-34, the active material of which contains 3% by weight of copper, may be mixed with glass fibres and powdered synthetic boehmite (Pural SB) and processed in an aqueous solution with a pH-value of 3.5 into a shapeable and flowable slip containing a wt % of 3.5 wt % cellulose (CMC-QP10000H), 1.8 wt % of the plasticizer Zusoplast (a brand name of Zschimmer & Schwarz GmbH &

Co KG) 3.5 wt % of the organic auxiliary agent PEO Alkox (a polyethylene oxide) and a total of 13 wt % of a mixture of the pore modifiers Rettenmaier BC200, a natural cellulosic material and polyacrylonitrile (PAN) fibres. The quantitative proportions of the starting materials may be selected in such a way that the active material of the finished solid catalyst body contains 60% by weight of Cu-exchanged SAPO-34, 35% by weight of $\gamma$-$Al_2O_3$, 5% by weight of glass fibres. The shapeable mixture may be extruded into a honeycomb catalyst body with continuous channels and with a circular cross-section exhibiting a cell density of 300 cpsi (cells per square inch). Subsequently, the catalyst body may be freeze dried for 1 hour at 2 mbar according to the method described in WO 2009/080155 (the entire contents of which is incorporated herein by reference) and calcined at a temperature of 580° C. to form a solid catalyst body. The extruded zeolite monolith substrate is expected to have an inflow area with a diameter of approximately 14 cm and a flow-through length of approximately 19 cm. The resulting product typically would have a mean pore size of approximately 10 μm.

The extruded flow-through monolith substrate comprising a plurality of channels may be made into a wall-flow filter arrangement whereby a plurality of first channels is plugged at an upstream end and a plurality of second channels not plugged at the upstream end are plugged at a downstream end, wherein the arrangement of the first and second channels is such that laterally and vertically adjacent channels are plugged at opposite ends in the appearance of a checkerboard by inserting substantially gas impermeable plugs at the ends of the channels in the desired pattern according to EP 1837063 (the entire contents of which is incorporated herein by reference). This filter arrangement is also disclosed in SAE 810114 (the entire contents of which is incorporated herein by reference).

The wall-flow filter can be coated with a washcoat according to the methods disclosed in WO 99/47260 or PCT/GB2011/050005 filed on 4 Jan. 2011. The latter method comprises the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

For the avoidance of any doubt, the entire contents of any and all documents cited herein are incorporated herein by reference.

The invention claimed is:

1. A filter comprising a catalyst for converting oxides of nitrogen in the presence of a reducing agent, the filter comprising:
    10-95% by weight of at least one binder/matrix component;
    5-90% by weight of a zeolitic molecular sieve, a non-zeolitic molecular sieve or a mixture of any two or more thereof; and
    0-80% by weight optionally stabilised ceria,
    wherein the filter is a wall-flow filter having an extruded solid body, and
    the catalyst comprising at least one metal, wherein:
        (i) the at least one metal is present throughout the extruded solid body and is also present in a higher concentration at a surface of the extruded solid body;
        (ii) the at least one metal is present throughout the extruded solid body and is also carried in one or more coating layer(s) on a surface of the extruded solid body; or
        (iii) the at least one metal is present throughout the extruded solid body, is present in a higher concentration at a surface of the extruded solid body and is also carried in one or more coating layer(s) on the surface of the extruded solid body.

2. A filter according to any claim 1, wherein the extruded solid body further comprises: 0-80% by weight of spinel and 0-25% by weight inorganic fibres, and wherein
    the at least one binder/matrix component is selected from the group consisting of a cordierite, nitrides, carbides, borides, intermetallics, lithium aluminosilicate, an optionally doped alumina, a silica source, titania, zirconia, titania-zirconia, zircon and mixtures of any two or more thereof;
    the zeolitic molecular sieve, the non-zeolitic molecular sieve or the mixture of any two or more thereof each optionally contains one or more metal.

3. A filter according to claim 2, wherein the extruded solid body consists essentially of: the at least one binder/matrix component; the zeolitic molecular sieve, the non-zeolitic molecular sieve or the mixture of any two or more thereof in an amount of 50-90% by weight; and 0-25% by weight of inorganic fibres, and wherein:
    the at least one binder/matrix component is selected from the group consisting of a cordierite, nitrides, carbides, borides, intermetallics, lithium aluminosilicate, a spinel, an optionally doped alumina, a source of silica, titania, zirconia, titania-zirconia, zircon and mixtures of any two or more thereof;
    the zeolitic molecular sieve, the non-zeolitic molecular sieve or the mixture of any two or more thereof each optionally contains one or more metal.

4. A filter according to claim 2, wherein the extruded solid body consists essentially of: the at least one binder/matrix component; the zeolitic molecular sieve, the non-zeolitic molecular sieve or the mixture of any two or more thereof in an amount of 5-50% by weight; the optionally stabilised ceria in an amount of 20-80% by weight; and 0-25% by weight of inorganic fibres, and wherein:
    the at least one binder/matrix component is selected from the group consisting of a cordierite, nitrides, carbides, borides, intermetallics, lithium aluminosilicate, an optionally doped alumina, a spinel, a silica source, titania, zirconia, titania-zirconia, zircon and mixtures of any two or more thereof;
    the zeolitic molecular sieve, the non-zeolitic molecular sieve or the mixture of any two or more thereof each optionally contains one or more metal.

5. A filter according to claim 1, wherein the porosity of the wall-flow filter is from 30-80%.

6. A filter according to claim 1, wherein the zeolitic molecular sieve, the non-zeolitic molecular sieve or the mixture of any two or more thereof is selected from the group consisting of AEI, BEA, CHA, ERI, FER, MFI, NSI, STI and mixtures of any two or more thereof.

7. A filter according to claim 1, wherein the zeolitic molecular sieve, the non-zeolitic molecular sieve or the mixture of any two or more thereof is selected from the group consisting of ZSM-5, beta, ferrierite, SSZ-13 and mixtures of any two or more thereof.

8. A filter according to claim 1, wherein the zeolitic molecular sieve, the non-zeolitic molecular sieve or the mixture of any two or more thereof is an aluminophosphate.

9. A filter according to any of claims 8, wherein the aluminophosphate is selected from the group consisting of SAPO-18, SAPO-34, SAPO-44 and SAPO-47.

10. A filter according to claim 1, wherein the at least one metal present in each of: (a) throughout the extruded solid body; (b) present in a higher concentration at a surface of the extruded solid body; and (c) carried in one or more coating layer(s) on a surface of the extruded solid body in features (i), (ii), and (iii) is different from the at least one metal present in the other location(s).

11. A filter according to claim 1 wherein the at least one metal is associated with the zeolitic molecular sieve component, the non-zeolitic molecular sieve component or either or both of the zeolitic molecular sieve component and the non-zeolitic molecular sieve components in the mixture.

12. A filter according to claim 11, wherein the extruded solid body comprises at least one first metal associated with the zeolitic molecular sieve component, the non-zeolitic molecular sieve component or either or both of the zeolitic molecular sieve component and the non-zeolitic molecular sieve components in the mixture and at least one second metal that is not associated with the zeolitic molecular sieve component, the non-zeolitic molecular sieve component or either or both of the zeolitic molecular sieve component and the non-zeolitic molecular sieve components in the mixture.

13. A filter according to claim 11, wherein the at least one metal comprises a transition metal, and the transition metal is selected from the group consisting of Fe, Cu, Ce, Hf, La, Mn, Pt, Au, Ag, In, Rh, V, Ir, Ru, and Os.

14. A filter according to claim 1, wherein the at least one metal: throughout the extruded solid body; in the majority of the at least one metal located at the surface of the extruded solid body; in one or more coating layer(s) on the surface of the extruded solid body; or in the higher concentration at the surface of the extruded solid body comprises at least one metal selected from the group consisting of an alkali metal, an alkaline earth metal, a transition metal, a lanthanide or a mixture of any two or more thereof, and
wherein the at least one metal throughout the extruded solid body is not associated with the zeolitic molecular sieve component, the non-zeolitic molecular sieve component or either or both of the zeolitic molecular sieve component and the non-zeolitic molecular sieve components in the mixture.

15. A filter according to claim 1 further comprising one or more coating layer(s) on a surface of the extruded solid body, wherein the coating layer(s) comprises the at least one metal, wherein the total metal content of the catalyst is from 0.1 to 30% by weight.

16. A filter comprising an extruded solid body consisting essentially of:
10-50% by weight of cordierite, nitrides, carbides, borides, intermetallics, lithium aluminosilicate, a spinel, an optionally doped alumina, titania, zirconia, titania-zirconia, zircon and mixtures of any two or more thereof;
0-30% by weight of a source of silica;
50-90% by weight of a non-zeolitic molecular sieve containing 1-20% by weight of one or more metal selected from the group consisting of Cu, Fe and Ce; and
0-20% by weight of inorganic fibres,
wherein the filter is a wall-flow filter.

17. A process of manufacturing a filter according to any preceding claim, which process comprising the steps of:
mixing powdered starting materials of: at least one binder/matrix component or a precursor of one or more thereof; zeolitic molecular sieve, non zeolitic molecular sieve or a mixture of any two or more thereof, which zeolitic molecular sieve, non-zeolitic molecular sieve or mixture of zeolitic and non-zeolitic molecular sieves being optionally associated with at least one metal; an optional optionally stabilised ceria; and at least one metal compound; with optional inorganic fibers; optionally adding an organic auxiliary agent;
processing by mixing and/or kneading in an acid or alkaline aqueous solution optionally containing a metal salt of at least one metal into a plastic compound to form a mixture;
extruding the mixture into a catalyst body, drying the catalyst body, calcining to form a solid extruded body, and plugging ends of channels of the solid extruded body to form a wall-flow filter;
selecting quantitative proportions of the starting materials such that the solid extruded body contains 10-95% by weight of at least one binder/matrix component; 5-90% by weight of a zeolitic molecular sieve, a non-zeolitic molecular sieve or a mixture of any two or more thereof; and 0-80% by weight optionally stabilised ceria, and at least one metal or metal compound and optionally impregnating a surface of the solid extruded body with at least one metal and/or optionally coating a surface of the solid extruded body with at least one coating layer(s) containing at least one metal.

18. A method of treating exhaust gas emissions from internal combustion engines from a stationary source or a vehicle, which method comprising contacting the exhaust gas mixed with a nitrogenous reductant with a filter according to claim 1.

19. An exhaust system for an internal combustion engine, which exhaust system comprising a filter according to claim 1, a source of nitrogenous reductant and means for injecting nitrogenous reductant into a flowing exhaust gas upstream of the wall-flow filter.

20. A vehicle comprising an internal combustion engine and an exhaust system according to claim 19.

* * * * *